United States Patent [19]

Do

[11] Patent Number: 5,193,575

[45] Date of Patent: Mar. 16, 1993

[54] ADJUSTABLE DIFFERENTIAL PRESSURE VALVE

[75] Inventor: Hung M. Do, Olean, N.Y.

[73] Assignee: Dresser-Rand, Corning, N.Y.

[21] Appl. No.: 851,094

[22] Filed: Mar. 13, 1992

[51] Int. Cl.5 .................................... F16K 31/124
[52] U.S. Cl. .................................. 137/509; 137/906
[58] Field of Search ................... 137/509, 510, 906

[56] References Cited

U.S. PATENT DOCUMENTS

| | | | |
|---|---|---|---|
| 2,766,579 | 10/1956 | Gallow et al. | 137/495 |
| 2,984,254 | 5/1961 | Allen | 137/509 X |
| 3,443,582 | 5/1969 | Linden | 137/495 |
| 3,454,041 | 7/1969 | Masson | 137/505.11 |
| 3,529,622 | 9/1970 | Weise et al. | 137/906 X |
| 3,636,970 | 1/1972 | Griffith et al. | 137/495 |
| 3,747,629 | 7/1973 | Bauman | 137/505 |
| 4,073,466 | 2/1978 | Snyder | 137/624.27 |
| 4,077,569 | 3/1978 | Deines | 137/509 X |
| 4,254,790 | 3/1981 | Eriksson et al. | 137/100 |
| 4,284,039 | 8/1981 | Bellicardi et al. | 137/510 X |
| 4,336,820 | 6/1982 | Jorgensen et al. | 137/100 |
| 4,424,738 | 1/1984 | Leighton | 137/510 X |
| 4,863,101 | 9/1989 | Pater et al. | 137/906 X |
| 4,896,691 | 1/1990 | Green et al. | 137/100 |
| 4,924,904 | 5/1990 | Carter | 137/505.11 |

FOREIGN PATENT DOCUMENTS

55-118109 9/1980 Japan .

*Primary Examiner*—Stephen M. Hepperle
*Attorney, Agent, or Firm*—Jones, Day, Reavis & Pogue

[57] ABSTRACT

An adjustable differential pressure valve that controls the pressure of a input fluid by maintaining a pressure differential between the fluid and another fluid, or fluids, of reference pressure, acts as a bypass valve and allows the pressure differential to be adjusted from the outside of the valve either mechanically or by remote hydraulic pressure.

10 Claims, 1 Drawing Sheet

5,193,575

ADJUSTABLE DIFFERENTIAL PRESSURE VALVE

FIELD OF THE INVENTION

The present invention relates to pressure regulators in general and in particular to a pressure regulator that can adjust the pressure differential from the outside of the valve either mechanically or hydraulically from a remote source.

BACKGROUND OF THE INVENTION

Pressure regulator valves are commonly used to control the pressure of fluids supplied to various devices such as natural gas to gas fired appliances such as water heaters, furnaces and the like. One common type of pressure regulator employs a modulating valve controlled by a diaphragm responsive to fluid pressure, the diaphragm being biased by a spring which opposes the force exerted by the pressurized fluid and thus controls the action of the diaphragm. Other valves control the pressure of a fluid to maintain a pressure differential between that fluid and another fluid of reference pressure.

In all of these valves, the valves are either very complicated and have variable adjustments to select a predetermined pressure differential or are simple but have fixed components which cannot be altered or which must be altered by taking the valve apart and adjusting a component thereof.

The present invention overcomes the disadvantages of the prior art by providing a valve which controls the pressure of an input fluid by maintaining a pressure differential between that fluid and another fluid or fluids of reference pressure. It also acts as a bypass valve and allows the pressure differential to be adjusted external to the valve either mechanically or hydraulically from a remote source.

In the present invention, a piston divides an enclosed hollow body into first and second fluid-tight chambers. In one chamber is an input and an output orifice for a fluid whose pressure is to be regulated. An extension is connected to the piston in the first chamber for selectively opening and closing the output fluid orifice upon movement of the piston. A reference fluid input orifice and an adjustable pressure spring are formed in &:he second chamber in contact with the piston such that when the combined pressure of the reference fluid and the spring on one side of the piston exceeds the pressure of the input fluid on the other side of the piston, the output orifice closes, and when the pressure of the input fluid on one side of the piston exceeds the combined pressure of the reference fluid and the spring on the other side of the piston, the output orifice opens, thus bypassing the input fluid at a predetermined pressure. An elongated projection is threadedly inserted in an opening in the second chamber and is in contact with the spring, which contacts the piston, to vary the pressure of the spring on the piston and the pressure at which the output fluid orifice will open. Thus, when the elongated projection is mechanically threaded into or out of the second chamber, it increases or decreases the pressure on the piston through the spring to vary the pressure at which the output orifice in the first chamber will open.

The elongated projection also has an orifice therein and a second extension on the piston in the second chamber sealably extends partially into the hollow orifice. If it is desired to control the differential valve from a remote location, a hydraulic fluid is coupled to the opening in the elongated projection and a fluid of desired pressure is supplied thereto which engages the second extension of the piston thus applying force to the extension, and the piston, to vary the point at which the output orifice in the first chamber will open.

Thus it is an object of the present invention to provide a valve which controls the pressure of an input fluid by maintaining a pressure differential between that fluid and another fluid of reference pressure.

It is also an object of the present invention to provide a valve which acts as a bypass valve when the input fluid exceeds a reference pressure.

It is another important object of the present invention to provide a valve in which the pressure differential can be adjusted from the outside of the valve either mechanically or remotely by varying a hydraulic pressure to the valve.

It is also an object of the present invention to provide a differential pressure valve in which a reference pressure is supplied by both a reference fluid and a spring acting on a piston such that the pressure can be varied by externally varying the pressure applied to the spring which varies the pressure applied to the piston.

SUMMARY OF THE INVENTION

Thus the present invention relates to a pressure differential valve comprising an enclosed hollow body, a piston in the hollow body dividing the body into first and second fluid-tight chambers, and an input and an output fluid orifice in the first chamber, a first extension on the piston for selectively opening and closing the output fluid orifice, and a reference fluid input orifice and an adjustable pressure spring in the second chamber in contact with the piston such that when the combined pressure of the reference fluid and the spring on one side of the piston exceeds the pressure of the input fluid on the other side of the piston, the output orifice closes, and when the pressure of the input fluid on the piston exceeds the combined pressure of the reference fluid and the spring on the piston, the output orifice opens.

BRIEF DESCRIPTION OF THE DRAWINGS

These and other objects of the present invention will be more fully disclosed when taken in conjunction with the following detailed specification and the drawings in which like numerals represent like elements and in which.

DETAILED DESCRIPTION OF THE DRAWINGS

Figure 1:
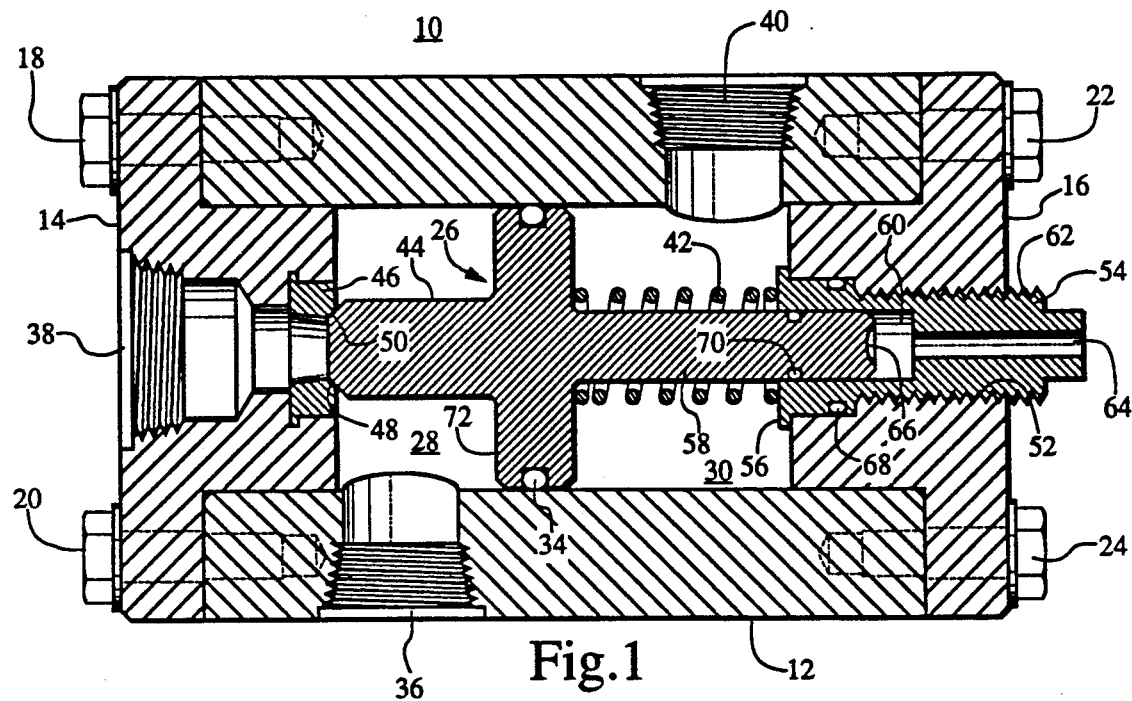
FIG. 1 is a cross-sectional view of the valve in its closed position.

As can be seen in FIG. 1, the valve 10 comprises a hollow body 12 having end covers 14 and 16 sealing each open end of the housing. The end cover 14 may be attached to the housing 12 by means of bolts 18 and 20 and end cap or cover 16 may be attached to the other end of the housing 12 by means such as bolts 22 and 24. A piston 26 in the housing 12 separates the housing 12 into first and second chambers 28 and 30. Seal 34 on the piston 26 separates the chambers 28 and 30 in a fluid-tight relationship. The seal 34 may actually be a single O-ring which goes around the periphery of the piston 26 in contact with the interior of housing 12. An input pressure orifice 36 and an output pressure orifice 38 are formed in the first chamber 28. A variable reference pressure orifice 40 and an adjustable spring 42 are located in the second chamber 30. An elongated extension 44 extending from piston 26 in the first chamber 28 sealably contacts a sealing member 46 in the end cover 14 such that when the combined reference pressure applied to orifice 40 and the pressure of spring 42 exceeds the input fluid pressure applied to orifice 36, the piston 26 is moved to the left in FIG. 1 and the extension 44 mates with the seal member 46 to close the output orifice 38. Seal member 46 has sloping shoulders 50 that match with sloping shoulders 48 on the projection 44 of piston 26.

When the input fluid pressure in orifice 36 exceeds the combined reference fluid pressure in orifice 40 and the pressure of spring 42, piston 26 moves to the right thus opening the output orifice 38 and bypassing fluid through the valve 10. In order to adjust the pressure at which the output orifice 38 is opened and closed, the pressure of spring 42 is adjusted external to the housing 12 through opening 52 extending into the second chamber 30 in the wall 16. An elongated body 54 is threadedly inserted in the opening 52 in the end wall 16 with a base 56 that is in contact with spring 42. A stem 58 extending from piston 26 on the inside of spring 42 in second chamber 30 is sealably and slideably inserted in an opening 60 in the elongated body 54. Since the body 54 has threads 62 thereon it can be threaded into or out of the end cover 16, thus increasing or decreasing the pressure on spring 42 by compressing it more or less. The total pressure of the spring 42 when combined with the reference pressure in orifice 40 can be varied by changing the pressure on spring 42 thus setting the pressure at which the output orifice 38 will be opened and closed. An orifice 64 is also formed in the elongated body 54 such that it is in fluid contact with the top 66 of the extension 58 from the piston 26. Therefore, by coupling the orifice 64 to a remote pressure source, the pressure on the top 66 of stem 58 and, thus, piston 26 can be varied. The pressure at which the differential valve will open or close, therefore, can be varied remotely. It will be noted that seal 68 maintains the elongated body 54 in a fluid-tight relationship with the end cover 16. In like manner, seals 70 maintain the extension 58 of piston 26 in fluid-tight relationship with the chamber 60 of the elongated body 54.

Figure 2:
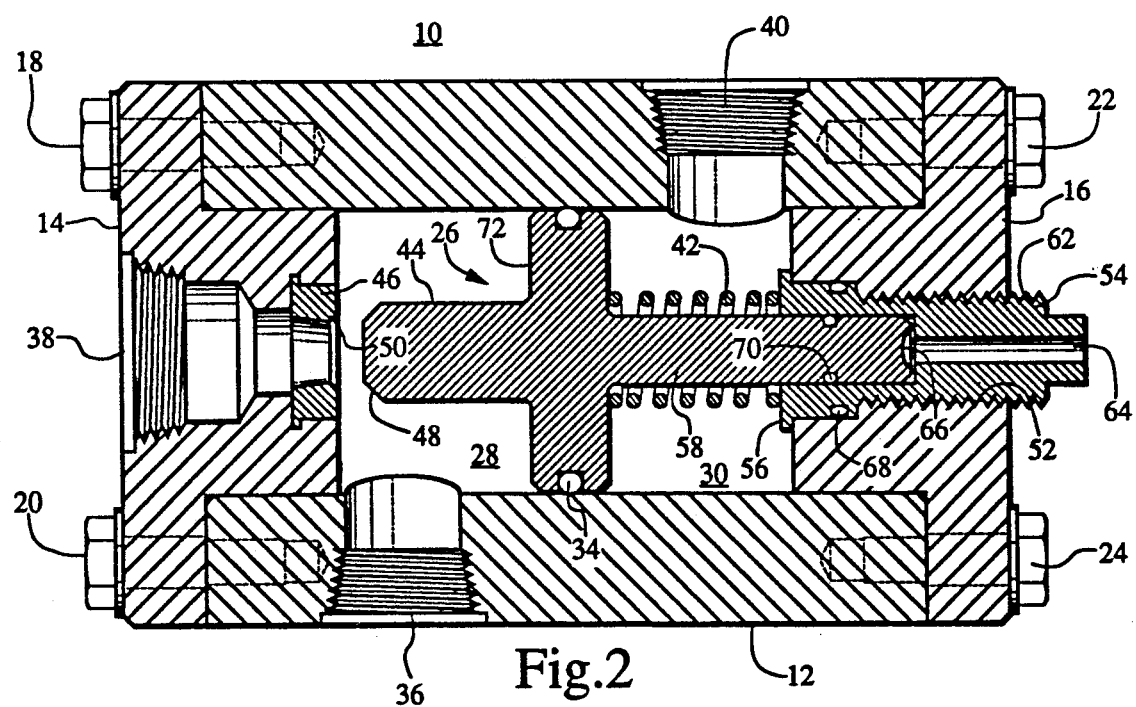
FIG. 2 is a cross-sectional view of the valve in its open position when the input pressure exceeds the reference pressure.

As can be seen in FIG. 1, with a reference pressure in orifice 40 and the spring pressure 42 preset and/or any remote fluid pressure coupled to orifice 64, the piston 26 has moved to the left and seals the output orifice 38 such that input fluid on orifice 36 cannot pass through the valve. However, as illustrated in FIG. 2, when the input pressure in orifice 36 exceeds the reference pressure in orifice 40 and the pressure of spring 42 and any remote pressure in orifice 64, the piston 26 moves to the right, thus opening the output orifice 38 and allowing the fluid at input orifice 36 to bypass through the valve 10. As can be seen in FIG. 2, the stem 58 on piston 26 has moved to the right into the hollow chamber 60 in the elongated body 54.

In the preferred embodiment, the pressure area 72 of piston 26 in the first chamber 28 and the pressure area 74 of the piston 26 in the chamber 30 are equal so that only the fluid pressure differential is balanced by the force due to the spring 42. However, the areas 72 and 74 on the piston 26 are not required to be the same as shown on FIG. 1 and FIG. 2 and the ratio of one area to the other may vary to determine the amount of the spring pressure necessary to balance the pressure differential. By turning the adjusting device 54, the length of the spring 42 is reduced or increased and, thus, the force produced by the spring 42 is increased or decreased. In like manner, increasing or decreasing the fluid pressure in orifice 64 also may be used as a force to balance a pressure differential from a remote location. By measuring the amount of the elongated body 54 that projects from the end cover 16, an accurate spring force can be calculated.

Thus, there has been disclosed a novel pressure differential valve which (1) controls the pressure of an input fluid by maintaining a pressure differential between the input fluid and another fluid or fluids of reference pressure, (2) acts as a bypass valve, and (3) allows the pressure differential to be adjusted from the outside of the valve either mechanically or hydraulically from a remote location.

Since different types of gases may be regulated by the valve where one gas is commonly supplied at a much lower pressure than the other, it is normally necessary to employ a different regulator for each type of gas or to provide a regulator which is convertible for use with either type. The present valve can be used with various types of gases or fluids. Further, the fluids may be oil and a gas such as nitrogen, air or carbon dioxide.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A pressure differential valve comprising:
   a hollow enclosed valve housing;
   a slidable piston in the housing separating the housing into first and second chambers, the piston having opposing faces;
   only an input fluid pressure orifice and an output fluid pressure orifice in the first chamber of the housing;
   an input fluid orifice engagement projection extending from one face of said piston into the first chamber for selectively sealing the input fluid orifice;
   a variable reference fluid pressure orifice and an externally adjustable pressure spring in the second chamber of the housing such that the reference fluid pressure and the externally adjusted spring pressure forces the piston orifice engagement projection to close the output fluid pressure orifice until the input fluid pressure exceeds the sum of the reference fluid pressure and the externally adjusted spring pressure;
   a second projection extending from the other face of the piston; and
   a pressure inlet in the housing coupled only to the slidable piston second projection for providing variable pressure on the piston from a remote pressure source.

2. A valve as in claim 1 further including:
   an opening in the second chamber of the housing forming the pressure inlet; and
   a hollow elongated body threadedly inserted in the second chamber opening and in contact with the spring such that by threading the elongated body into and out of the housing, the spring pressure on the piston is varied.

3. A valve as in claim 2 wherein the piston has unequal areas on the sides thereof wherein the ratio of one area to the other determines the amount of the spring pressure necessary to balance the fluid pressure differential.

4. A valve as in claim 2 further comprising:
a hollow portion in the elongated body; and
a stem forming the second projection on the piston and inserted in the hollow portion of the elongated body; the spring surrounding the piston stem between the piston and the hollow body such that as the elongated body is threadably inserted in the orifice, the spring pressure on the piston is increased.

5. A valve as in claim 2 wherein a portion of the elongated body extends outwardly of the housing such that the spring force can be determined by the length of the body protruding from the housing.

6. An adjustable differential pressure valve comprising:
an enclosed body member with open ends;
an end cover for each open end to form a hollow chamber;
a slidable pressure differential piston having first and second opposing faces in said hollow chamber forming a first reference fluid pressure chamber and a second input fluid pressure chamber, the chambers being fluid isolated from each other,
an output fluid orifice in the end cover of the second input fluid pressure chamber;
a sealing member on the piston in sealing alignment with the fluid output orifice;
an input fluid pressure orifice in fluid contact with the interior of the second input fluid pressure chamber;
a reference input fluid pressure orifice in fluid contact with the first reference fluid pressure chamber;
an externally adjustable spring in the first reference fluid pressure chamber such that the externally adjusted spring force in conjunction with the reference input fluid pressure on the first face of the piston can be set to balance a predetermined input fluid pressure on the other face of the piston in the second input fluid chamber and require the input fluid pressure to exceed the reference fluid pressure plus the externally adjusted spring pressure to move the piston to open the output fluid orifice; and
a pressure inlet in the housing coupled only the slidable piston in the first chamber for providing a variable fluid pressure on the piston from a remote source to vary the reference pressure.

7. A pressure differential valve comprising:
an enclosed hollow body;
a piston in the hollow body, the piston having opposing faces dividing the body into first and second fluid-tight chambers;
an input and an output fluid orifice in the first chamber;
a first extension on one face of the piston in the first chamber for selectively opening and closing the output fluid orifice;
a second extension on the other face of the piston in the second chamber;
a fluid input orifice for providing a fixed reference pressure and an externally adjustable pressure spring in the second chamber in contact with the piston for providing a variable reference pressure such that when the combined pressure of the reference fluid and the externally adjusted spring on the piston exceed the pressure of the input fluid on the piston, the output fluid orifice closes and when the pressure of the input fluid on the piston exceeds the combined pressure of the reference fluid and the spring on the piston, the output fluid orifice opens; and
a second fluid input orifice in the second chamber in fluid transfer relationship with only the second extension of the piston for providing a variable reference fluid pressure to the piston for remote control of the valve.

8. A pressure differential valve as in claim 7 further including:
a threaded opening in the second chamber; and
an elongated projection threadedly inserted in the opening into the second chamber and in contact with the spring to vary the pressure of the spring on the piston and the pressure at which the output fluid orifice will open by selectively threading the projection into and out of the opening.

9. A valve as in claim 8 further including:
a hollow orifice extending longitudinally through the elongated projection into the second chamber to form the second input fluid orifice; and
the second extension on the piston sealably extending partially into the hollow orifice such that a variable external pressure may be applied to the hollow orifice to assist the reference fluid pressure and the externally adjustable spring in varying the pressure at which the output fluid orifice will open.

10. A remotely controllable pressure differential valve comprising:
a piston moveably and sealably separating an enclosed housing into first and second chambers;
input and output fluid orifices in the first chamber for receiving an input fluid pressure;
sealing means associated with the piston in the first chamber for selectively sealing the output fluid orifice;
an input fluid orifice in the second chamber for receiving a reference fluid pressure for contacting the piston;
a resilient compressible spring in the second chamber externally adjustable in compression and opposing movement of the piston toward &:he second chamber to assist the reference fluid pressure in opposing the input fluid pressure so as to maintain the output fluid orifice sealed until the input fluid pressure exceeds the combined pressure of the reference fluid and the externally adjusted compression of the spring;
hollow means threadedly extending into the second chamber for contact with the resilient spring; and
an extension on the piston in the second chamber for fluid sealable insertion in said threadedly hollow means such that the pressure on the piston in the second chamber may be varied both mechanically by adjusting the spring compression and by a remote pressure source coupled to the threadedly hollow means.

* * * * *

UNITED STATES PATENT AND TRADEMARK OFFICE
CERTIFICATE OF CORRECTION

PATENT NO. : 5,193,575
DATED : March 16, 1993
INVENTOR(S) : DO

It is certified that error appears in the above-identified patent and that said Letters Patent is hereby corrected as shown below:

Column 1, line 46, "&:he" should read --the--.

Column 6, line 51, "&:he" should read --the--.

Signed and Sealed this

Fifteenth Day of March, 1994

Attest:

BRUCE LEHMAN

*Attesting Officer*     *Commissioner of Patents and Trademarks*